United States Patent
Robison

[11] Patent Number: 6,152,375
[45] Date of Patent: Nov. 28, 2000

[54] REMOTE CONTROL THERMOSTAT SYSTEM FOR CONTROLLING ELECTRIC DEVICES

[76] Inventor: Jerry L. Robison, 425 Monroe Ave. #11, Findlay, Ohio 45840

[21] Appl. No.: 09/296,308

[22] Filed: Apr. 22, 1999

[51] Int. Cl.[7] .................................................. G05D 23/00
[52] U.S. Cl. ..................... 236/51; 236/74 R; 236/74 A; 236/78 D
[58] Field of Search ................... 236/51, 78 R, 236/78 D, 74 R, 74 A

[56] References Cited

U.S. PATENT DOCUMENTS

| | | |
|---|---|---|
| 4,240,077 | 12/1980 | Hughes et al. . |
| 4,433,719 | 2/1984 | Cherry et al. . |
| 4,583,682 | 4/1986 | Hernandez . |
| 4,889,179 | 12/1989 | Merenda . |
| 4,969,508 | 11/1990 | Tate et al. .................................. 165/22 |
| 5,145,112 | 9/1992 | Ueda . |
| 5,234,050 | 8/1993 | Weigert . |
| 5,272,477 | 12/1993 | Tashima et al. .................... 340/870.16 |
| 5,390,206 | 2/1995 | Rein et al. ..................................... 375/1 |
| 5,528,229 | 6/1996 | Mehta . |
| 5,582,233 | 12/1996 | Noto . |
| 5,590,831 | 1/1997 | Manson et al. ............................ 236/51 |
| 5,765,636 | 6/1998 | Meyer et al. . |
| 5,833,134 | 11/1998 | Ho et al. . |
| 5,839,654 | 11/1998 | Weber ....................................... 236/47 |
| 5,927,599 | 7/1999 | Kath .......................................... 236/47 |

Primary Examiner—William Doerrler
Assistant Examiner—Marc Norman

[57] ABSTRACT

A remote control thermostat system for controlling electric devices for remotely controlling electric heating and cooling devices for regulating temperatures inside a structure. The remote control thermostat system for controlling electric devices includes a thermostat with a transmitter for emitting signals varying with the ambient temperature around the thermostat. A control unit is in communication with a power source and has a receiver for receiving the signals from the thermostat. The control unit is adapted for selectively permitting flow of power to an electric device in response to signals received from the thermostat.

19 Claims, 2 Drawing Sheets

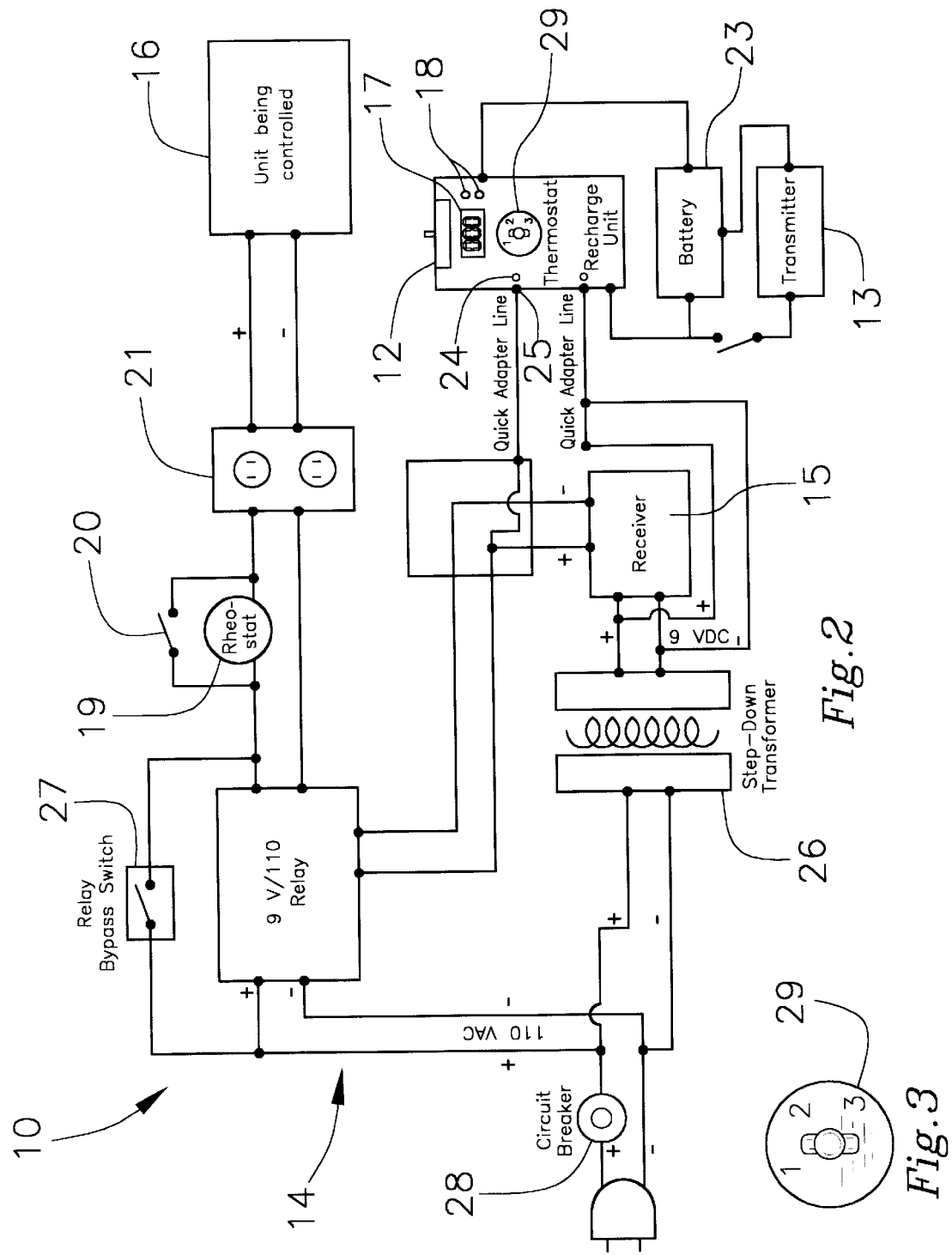

REMOTE CONTROL THERMOSTAT SYSTEM FOR CONTROLLING ELECTRIC DEVICES

BACKGROUND OF THE INVENTION

1. Field of the Invention

The present invention relates to remote controllers and electric receivers and more particularly pertains to a new energy saving remote control thermostat system for controlling electric devices such as electric heating and cooling devices for regulating temperatures inside a structure.

2. Description of the Prior Art

The use of remote controllers and electric receivers is known in the prior art. More specifically, remote controllers and electric receivers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,765,636; 5,528,229; 5,582,233; 5,833,134; 4,433,719; 4,583,682; 5,234,050; 5,145,112; 4,889,179; and 4,240,077.

While these devices fulfill their respective, particular objectives and requirements, the aforementioned patents do not disclose a new remote control thermostat system for controlling electric devices. The inventive device includes a thermostat with a transmitter for emitting signals varying with the ambient temperature around the thermostat. A control unit is in communication with a power source and has a receiver for receiving the signals from the thermostat. The control unit is adapted for selectively permitting flow of power to an electric device in response to signals received from the thermostat.

In these respects, the remote control thermostat system for controlling electric devices according to the present invention substantially departs from the conventional concepts and designs of the prior art, and in so doing provides an apparatus primarily developed for the purpose of remotely controlling electric heating and cooling devices for regulating temperatures inside a structure.

SUMMARY OF THE INVENTION

In view of the foregoing disadvantages inherent in the known types of remote controllers and electric receivers now present in the prior art, the present invention provides a new remote control thermostat system for controlling electric devices construction wherein the same can be utilized for remotely controlling electric heating and cooling devices for regulating temperatures inside a structure.

The general purpose of the present invention, which will be described subsequently in greater detail, is to provide a new remote control thermostat system for controlling electric devices apparatus and method which has many of the advantages of the remote controllers and electric receivers mentioned heretofore and many novel features that result in a new remote control thermostat system for controlling electric devices which is not anticipated, rendered obvious, suggested, or even implied by any of the prior art remote controllers and electric receivers, either alone or in any combination thereof.

To attain this, the present invention generally comprises a thermostat with a transmitter for emitting signals varying with the ambient temperature around the thermostat. A control unit is in communication with a power source and has a receiver for receiving the signals from the thermostat. The control unit is adapted for selectively permitting flow of power to an electric device in response to signals received from the thermostat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote control thermostat system for controlling electric devices apparatus and method which has many of the advantages of the remote controllers and electric receivers mentioned heretofore and many novel features that result in a new remote control thermostat system for controlling electric devices which is not anticipated, rendered obvious, suggested, or even implied by any of the prior art remote controllers and electric receivers, either alone or in any combination thereof.

It is another object of the present invention to provide a new remote control thermostat system for controlling electric devices which may be easily and efficiently manufactured and marketed.

It is a further object of the present invention to provide a new remote control thermostat system for controlling electric devices which is of a durable and reliable construction.

An even further object of the present invention is to provide a new remote control thermostat system for controlling electric devices which is susceptible of a low cost of manufacture with regard to both materials and labor, and which accordingly is then susceptible of low prices of sale to the consuming public, thereby making such remote control thermostat system for controlling electric devices economically available to the buying public.

Still yet another object of the present invention is to provide a new remote control thermostat system for controlling electric devices which provides in the apparatuses and methods of the prior art some of the advantages thereof, while simultaneously overcoming some of the disadvantages normally associated therewith.

Still another object of the present invention is to provide a new remote control thermostat system for controlling electric devices for remotely controlling electric heating and cooling devices for regulating temperatures inside a structure.

Yet another object of the present invention is to provide a new remote control thermostat system for controlling electric devices which includes a thermostat with a transmitter for emitting signals varying with the ambient temperature around the thermostat. A control unit is in communication with a power source and has a receiver for receiving the signals from the thermostat. The control unit is adapted for selectively permitting flow of power to an electric device in response to signals received from the thermostat.

Still yet another object of the present invention is to provide a new remote control thermostat system for controlling electric devices that eliminates the need to hardwire thermostats to heating and cooling devices, which can cause difficulties in retrofit situations.

Even still another object of the present invention is to provide a new remote control thermostat system for controlling electric devices that can control more than one electric device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic wiring diagram of the present invention.

FIG. 3 is a schematic side view of a dial for selecting wavelengths of the present invention.

DESCRIPTION OF THE PREFERRED EMBODIMENT

Figure 1:
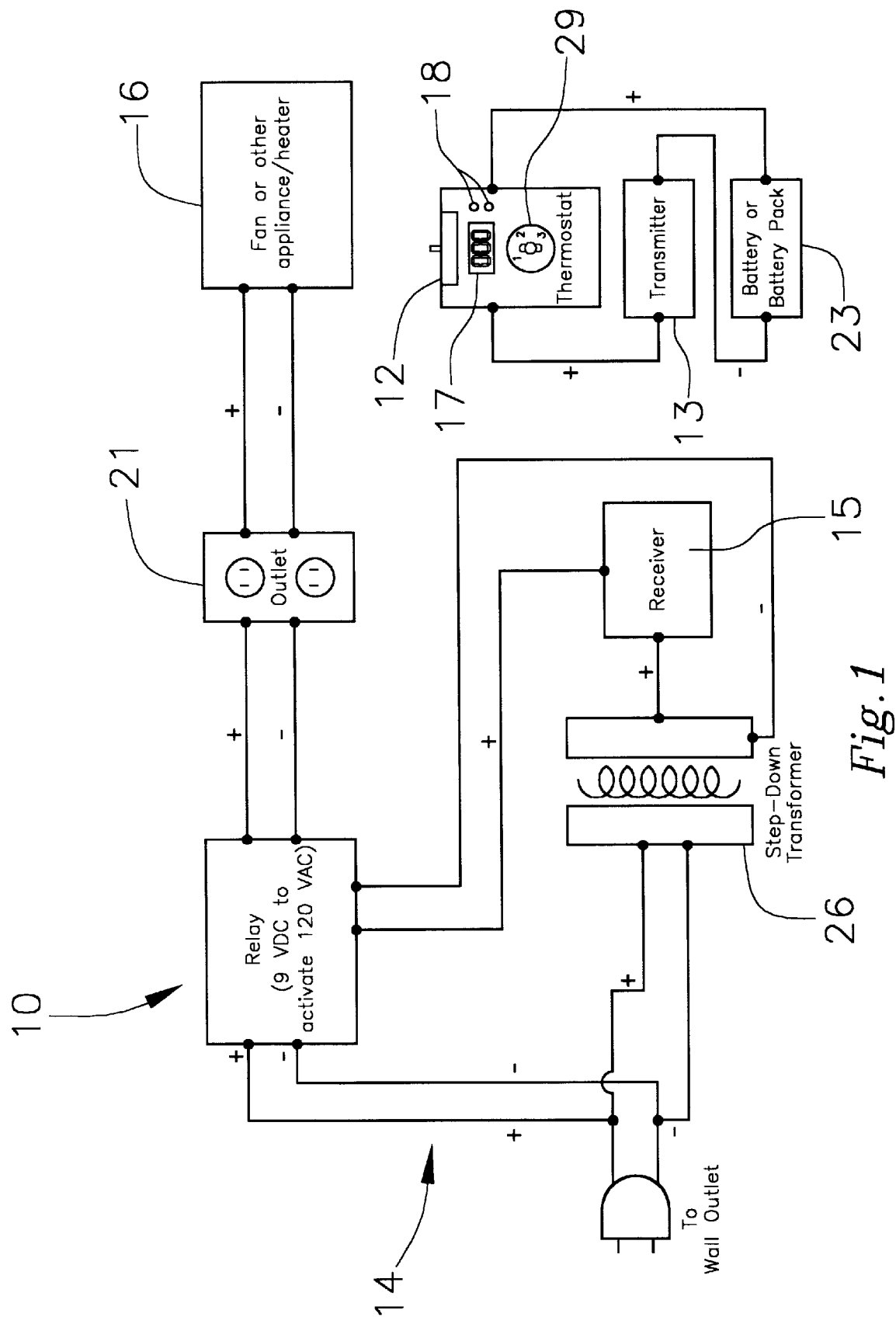
FIG. 1 is a schematic wiring diagram of a new remote control thermostat system for controlling electric devices according to the present invention.

With reference now to the drawings, and in particular to FIGS. 1 through 3 thereof, a new remote control thermostat system for controlling electric devices embodying the principles and concepts of the present invention and generally designated by the reference numeral 10 will be described.

As best illustrated in FIGS. 1 through 3, the remote control thermostat system for controlling electric devices 10 generally comprises a thermostat 12 with a transmitter 13 for emitting signals, such as via radio waves, varying with the ambient temperature around the thermostat. A control unit 14 is in communication with a power source and has a receiver 15 for receiving the signals from the thermostat. The control unit is adapted for selectively permitting flow of power to an electric device 16 such as a fan, heater, or cooling device in response to signals received from the thermostat. The thermostat senses an ambient temperature around the thermostat and sends a signal to the control unit, which permits or restricts the flow of electricity to the electric device.

The thermostat may be mounted to a wall, such as by hooks and loops fasteners, or could rest on a table or countertop in any location in a room.

Preferably, the thermostat has a digital display 17 for displaying a temperature setting and a control means 18 for setting a desired temperature setting. The digital display permits precise setting of the desired temperature. The control means may comprise a pair of buttons which raise and lower the temperature setting.

Also preferably, the control unit has a rheostat 19 for reducing the flow of electricity to the electric device. This is particularly useful for controlling the speed of a fan of the electric device. For example, a fan of the electric device could be initially set at full speed on the electric device. The rheostat would reduce the flow of electricity to slow the fan speed down to any desired speed below full speed. Optionally, the control has a rheostat bypass switch 20 for selectively permitting electricity to bypass the rheostat. The rheostat bypass switch would permit full power to flow to the electric device.

Preferably, the control unit has an outlet 21 adapted for receiving an electric plug (not shown) of the electric device. This permits an ordinary electric device such as a fan or window mounted air conditioner to be electrically connected to the control unit without special adaptation. Rather, the electric plug is merely plugged into the outlet of the control unit.

The thermostat may have a disposable or rechargeable power source 23 and a pair of first connection means 24 for detachably coupling with a second connection means 25 of the control unit for recharging the rechargeable power source. The rechargeable power source of the thermostat could include a rechargeable battery. The connection means could comprise wires has complementary plugs and sockets. The control unit would have a step down transformer 26 electrically connected to the second connection means for reducing the voltage of power flowing to the second control means, and thus the rechargeable power unit of the thermostat when the first and second connection means are connected.

The connection means could also permit direct control of the control unit from the thermostat. A switch would disconnect power from the transmitter when the first and second connection means are fastened together.

Preferably, the control unit has a control bypass switch 27 for permitting flow of electricity to the electric device independent of signals received from the receiver or to another thermostat connected to the electric device.

Also preferably, the control unit has a circuit breaker 28 for preventing damage caused by electrical overloads such as those resulting from short circuits or power surges.

Second and third control units (not shown), substantially the same as the control unit set forth above, may also be independently controlled by the thermostat. Each of the control units would have a receiver for receiving signals from the thermostat. The second and third control units are adapted for selectively permitting flow of power to second and third electric devices. In such case, the thermostat would have a selection dial 29 for selecting three different wavelengths of signals emitted by the thermostat. Each of the control units would respond to signals of a unique wavelength. However, the system does not have to be limited to three control units. Many different control units could be controlled by the thermostat.

In use, the desired temperature is set on the thermostat. The thermostat sends signals, continuously or in timed increments, to the control unit depending on the ambient temperature around the thermostat. For example, an on signal may be transmitted to turn the electric device on. An off signal would be transmitted to turn the electric device off.

In one example of use, a heater is positioned in a source room. The heat is concentrated in that room and moves to a target room through convection and dissipation. The control unit may be plugged into an electrical outlet in the source room. A fan is plugged into the control unit and turned on. The thermostat is positioned in the target room and set to a desired temperature. When the ambient temperature in the target room falls below the set level, the thermostat sends a signal to the control unit, instructing it to turn the fan on. The control unit permits power to flow to the fan, and the fan blows warm air from the source room into the target room. When the temperature in the target room reaches the predetermined level, the thermostat sends a signal to the control unit instructing it to sever power to the fan.

The same general scheme could be used with a window fan used to cool a room at night. In an exemplary scenario, the desired temperature is set on the thermostat, which is in the room. The expected low temperature outside the structure is expected to be well below the level set on the thermostat. The fan would blow the cooler air into the room until the target temperature is reached. Then the control unit would disconnect power from the fan. An occupant of the room then would not have to get up to turn the fan off to prevent overcooling of the room. Furthermore, the fan will be turned on when the temperature of the room again rises above the level set on the thermostat.

In a third exemplary use, the thermostat is placed in a portion of a vehicle, such as a back seat of a car or a sleeping portion of a semi trailer, to selectively operate a fan, a heater, or a cooling device attached to a control unit so that a desired temperature is maintained around the thermostat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote control system, comprising:
   a thermostat having a transmitter for emitting signals; and
   a control unit in communication with a power source and having a receiver for receiving said signals from said thermostat, said control unit being adapted for selectively permitting flow of power to an electric device in response to signals received from said thermostats;
   wherein said control unit has a rheostat for reducing the flow of electricity to the electric device.

2. The system of claim 1, wherein said thermostat has a digital display for displaying a temperature setting and a control means for setting a desired temperature setting.

3. The system of claim 1, wherein said control unit has a rheostat bypass switch for selectively permitting electricity to bypass said rheostat.

4. The system of claim 1, wherein said control unit has an outlet adapted for receiving a plug of the electric device.

5. The system of claim 1, wherein said thermostat has a rechargeable power source and a pair of first connection means for detachably coupling with a second connection means of said control unit for recharging said rechargeable power source.

6. The system of claim 1, wherein said control unit has a control bypass switch for permitting flow of electricity to said electric device independent of signals received from said receiver.

7. The system of claim 1, wherein said control unit has a circuit breaker for preventing electrical overloads.

8. The system of claim 1, wherein second and third control units each have a receiver for receiving signals from said thermostat, said second and third control units being adapted for selectively permitting flow of power to second and third electric devices.

9. The system of claim 8, wherein said thermostat has a selection dial for selecting three different wavelengths of signals emitted by said thermostat, each of said control units responding to signals of a unique wavelength.

10. A remote control system, comprising:
   a thermostat having a transmitter for emitting signals;
   a control unit in communication with a power source and having a receiver for receiving said signals from said thermostat, said control unit being adapted for selectively permitting flow of power to an electric device in response to signals received from said thermostat;
   said thermostat having a digital display for displaying a temperature setting and a control means for setting a desired temperature setting;
   said control unit having a rheostat for reducing the flow of electricity to the electric device;
   said control unit having a rheostat bypass switch for selectively permitting electricity to bypass said rheostat;
   said control unit having an outlet adapted for receiving a plug of the electric device;
   said thermostat having a rechargeable power source and a pair of first connection means for detachably coupling with a second connection means of said control unit for recharging said rechargeable power source;
   said control unit having a control bypass switch for permitting flow of electricity to said electric device independent of signals received from said receiver;
   said control unit having a circuit breaker for preventing electrical overloads;
   second and third control units each having a receiver for receiving signals from said thermostat, said second and third control units being adapted for selectively permitting flow of power to second and third electric devices; and
   said thermostat having a selection dial for selecting three different wavelengths of signals emitted by said thermostat, each of said control units responding to signals of a unique wavelength.

11. A remote control system, comprising:

a thermostat having a transmitter for emitting signals;

a control unit in communication with a power source and having a receiver for receiving said signals from said thermostat, said control unit being adapted for selectively permitting flow of power to an electric device in response to signals received from said thermostat; and second and third control units each having a receiver for receiving signals from said thermostat, said second and third control units being adapted for selectively permitting flow of power to second and third electric devices;

wherein said thermostat has a selection dial for selecting three different wavelengths of signals emitted by said thermostat, each of said control units responding to signals of a unique wavelength.

12. The system of claim 11, wherein said thermostat has a digital display for displaying a temperature setting and a control means for setting a desired temperature setting.

13. The system of claim 11, wherein said control unit has an outlet adapted for receiving a plug of the electric device.

14. The system of claim 11, wherein said thermostat has a rechargeable power source and a pair of first connection means for detachably coupling with a second connection means of said control unit for recharging said rechargeable power source.

15. The system of claim 11, wherein said control unit has a control bypass switch for permitting flow of electricity to said electric device independent of signals received from said receiver.

16. The system of claim 11, wherein said thermostat has a rechargeable power source and a pair of first connection means for detachably coupling with a second connection means of said control unit for recharging said rechargeable power source.

17. A remote control system, comprising:

a thermostat having a transmitter for emitting signals; and a plurality of control units, each said control unit being in communication with a power source, each said control unit having a receiver for receiving said signals from said thermostat, each said control unit being adapted for selectively permitting flow of power to an electric device in response to signals received from said thermostat;

wherein said thermostat has a selection dial for selecting one of a plurality of different wavelengths of signals emitted by said thermostat, each said control unit responding to signals of one of said plurality of different wavelengths.

18. The system of claim 17, wherein said control unit has a rheostat for reducing the flow of electricity to the electric device.

19. The system of claim 18, wherein said control unit has a rheostat bypass switch for selectively permitting electricity to bypass said rheostat.

* * * * *